United States Patent
Guillot (12)

(10) Patent No.: US 6,207,080 B1
(45) Date of Patent: Mar. 27, 2001

(54) COMPOSITE MATERIAL HAVING REACTANT(S) HOMOGENEOUSLY DISPERSED IN FLUID MATRIX

(75) Inventor: Philippe Guillot, Floirac (FR)

(73) Assignee: Aimco SA ( Automatic Instant Mesures et Controle Optique), Libourne (FR)

( * ) Notice: Subject to any disclaimer, the term of this patent is extended or adjusted under 35 U.S.C. 154(b) by 0 days.

(21) Appl. No.: 09/261,128

(22) Filed: Mar. 3, 1999

Related U.S. Application Data

(62) Division of application No. 08/759,707, filed on Dec. 6, 1996, now Pat. No. 5,928,126.

(30) Foreign Application Priority Data

Dec. 14, 1995 (FR) .................................................. 9514857

(51) Int. Cl.⁷ ................................. B01F 3/12; B01F 3/22; B32B 3/26; G01N 31/22
(52) U.S. Cl. ..................................... 252/408.1; 106/31.31; 106/31.33; 252/183.11; 428/321.5; 516/31; 523/210; 523/211
(58) Field of Search ...................... 252/182.11, 183.11, 252/962, 408.1; 264/4.6, 4; 427/213.31, 483; 516/31, 928; 366/348; 106/31.31, 31.33; 523/210, 211, 161; 503/226; 428/321.5

(56) References Cited

U.S. PATENT DOCUMENTS

| | | | |
|---|---|---|---|
| 3,016,308 | * 1/1962 | Macaulay | 264/4.6 X |
| 3,160,686 | * 12/1964 | Doyle et al. | 264/4 |
| 3,208,951 | * 9/1965 | Berger et al. | 264/4.7 |
| 3,725,501 | * 4/1973 | Hilbelink et al. | |
| 3,770,641 | * 11/1973 | Cantor et al. | 252/183.11 X |
| 4,413,069 | * 11/1983 | Marshall | 523/211 X |
| 4,578,339 | * 3/1986 | Adkins | 427/213.31 X |
| 4,640,714 | * 2/1987 | Kagota et al. | 106/31.33 X |
| 4,782,003 | * 11/1988 | Yoshihara | 427/213.31 X |
| 4,882,259 | * 11/1989 | O'Connor et al. | 427/213.31 X |
| 5,928,126 | * 7/1999 | Guillot | 516/31 |

FOREIGN PATENT DOCUMENTS

| | | |
|---|---|---|
| 33 35 174 | 4/1984 | (DE) . |
| 0 152 898 | 8/1985 | (EP) . |
| 0 321 750 | 6/1989 | (EP) . |
| 4-117468 | 4/1992 | (JP) . |
| WO 91/16382 | 10/1991 | (WO) . |

* cited by examiner

Primary Examiner—Richard D. Lovering
(74) Attorney, Agent, or Firm—Young & Thompson

(57) ABSTRACT

A process for homogeneously dispersing at least one reactant in a fluid matrix, characterized in that capsules of a first type containing the reactant(s) are prepared with a first encapsulation product and capsules of a second type containing the fluid matrix are prepared with a second encapsulation product which is compatible with the first, these two types of capsules bearing electric charges of opposite polarity, the capsules of the two types are combined by electric attraction and the first and second encapsulation products are removed so as to obtain a composite material consisting of the fluid matrix containing the reactant(s) in homogeneous dispersion form, and products obtained according to this process.

6 Claims, No Drawings

COMPOSITE MATERIAL HAVING REACTANT(S) HOMOGENEOUSLY DISPERSED IN FLUID MATRIX

CROSS-REFERENCE TO RELATED APPLICATIONS

This application is a division of application Ser. No. 08/759,707, filed Dec. 6, 1996 and issued as U.S. Pat. No. 5,928,126.

BACKGROUND OF THE INVENTION

The present invention relates to a process for homogeneously dispersing in a fluid matrix at least one reactant which is immiscible with the matrix, as well as to the products obtained by this process.

DESCRIPTION OF THE RELATED ART

The process of the present invention applies more particularly to the production of composite materials of the ink type, in which one or more reactants in the matrix display by themselves, or in combination with others, characteristics which change as a function of a predetermined external parameter, such as light radiation, in particular ultraviolet radiation, the temperature, the humidity and the magnetic field. The composition material obtained may thus serve to control a predetermined parameter using a visual signal or any other signal. In such an application, the matrix is polymerizable. These composite products must be able to be used by all the conventional means, such as paint, coating, printing in all its industrial forms, ink-spraying or aerosol spraying. It is thus necessary for the reactant(s) to be distributed very homogeneously in the fluid matrix in order to prevent the presence of agglomerates of reactant(s), which might have a negative impact on the application, or to prevent the presence of lacunae of reactant(s) in the layer applied, which would lead to defects and irregularities in the control signal of the determined parameter.

SUMMARY OF THE INVENTION

According to the present invention, a process is proposed which allows, in a fluid matrix, very homogeneous distribution of reactant(s) in particle form and which thereby makes it possible to obtain a composite material, which can be applied by all the conventional means, forming very fine films which have no identifiable lacunae of reactant(s).

The subject of the present invention is thus a process for homogeneously dispersing at least one reactant in a fluid matrix, characterized in that capsules of a first type containing the reactant(s) are prepared with a first encapsulation product and capsules of a second type containing the fluid matrix are prepared with a second encapsulation product which is compatible with the first, these two types of capsules bearing electric charges of opposite polarity, the capsules of the two types are combined by electric attraction and the first and second encapsulation products are removed so as to obtain a composite material consisting of the, fluid matrix containing the reactant(s) in homogeneous dispersion form.

The process according to the invention preferably includes the following steps:

a) the reactant(s) is(are) mixed with the first encapsulation product and, optionally, with a first solvent for the said first encapsulation product which is compatible with the said reactant(s), so as to obtain a pulverizable mixture, b) the mixture obtained is sprayed so as to obtain capsules containing the reactant(s) and, among these capsules, the capsules of the first type having an electric charge of determined polarity are selected, c) the fluid matrix is emulsified in the second encapsulation product, optionally in the presence of a second solvent which is capable of dissolving the said second encapsulation product and which is compatible with the fluid matrix, until matrix droplets of the desired size are formed in a continuous phase consisting of the second encapsulation product, those droplets of the emulsion which have an electric charge of opposite polarity to that of the capsules of the first type obtained in step b) are selected, the said droplets constituting the capsules of the second type in which the fluid matrix is encapsulated in a coating formed from the second encapsulation product, d) the walls of the capsules of at least one of the two types obtained in steps b) and c) above are softened using a third solvent which is compatible with at least one of the two encapsulation products, and the two types of capsules are mixed together so as to combine, by electric attraction, the capsules of reactant(s) and the capsules of fluid matrix in a continuous phase consisting of at least one of the two encapsulation products, e) the solvent(s) is(are) removed and the encapsulation product(s) is(are) separated from the mixture obtained in step d), so as to obtain a fluid matrix in which the reactant(s) is(are) homogeneously dispersed.

In step d), it is preferred to soften only the walls of the capsules of the first type using a solvent for the first encapsulation product. It is also preferred to use the same encapsulation product for steps a) and c).

Within the context of the present patent application, the term "particles" will be understood to denote both solid particles and droplets of a product in liquid form.

According to the invention, the term "fluid matrix" is understood to denote a matrix consisting of a relatively viscous product capable of flowing when the vessel in which it is contained is tipped over. The matrix may consist mainly of a monomer or of a polymer of low molecular weight.

The matrix may in particular contain at least one fluid polymer; it advantageously consists, mainly, of at least one polymer containing, in its repeating unit, a cyclic group, which may be a cycloaliphatic group such as cyclohexane, a cycloalkenyl group containing one or more ethylenic-type bonds, such as pentene, or an aryl group, for instance the phenyl, naphthyl and anthracenyl groups. A polyester of an acid containing an aryl group in its main chain and of an aliphatic polyol is preferably used.

DESCRIPTION OF THE PREFERRED EMBODIMENTS

According to a preferred embodiment, at least two reactants are used, which are capable of reacting together by means of a modification, such as a phase change, of at least one of the reactants under the effect of varying a determined parameter. It may be arranged that at least one of the reactants is solid at room temperature and is capable of melting at a temperature below the degradation temperature of the matrix and optionally at the melting and degradation temperatures of the other reactants. Two reactants are advantageously used which, in the same temperature zone, are in solid form and which come into reactional contact with each other, when one of the reactants reaches its melting point. A reactant may also be used which forms a solution in the presence of moisture and whose solution reacts with the other reactant. One of the products may also become gaseous and react in this form with the other reactant.

In this embodiment, one of the reactants is, for example, an acidic or basic compound and the other reactant is a pH-indicator product whose appearance or colour changes when the pH is changed. It is possible, in particular, to use a solid organic acid; acids which may be mentioned, by way of example, are tartaric acid (or dihydroxysuccinic acid) which melts at 170° C. and 3-cyclohexylpropionic acid which melts at 17° C. The pH-indicator product may be, for example, the disodium salt of erythrosin, which has an orange colour at a pH of 2.2 and a red colour at a pH of 3.6, or bromophenol blue which changes colour at pH=8.5. When the acid melts after an increase in temperature, it becomes liquid and comes into contact with the pH indicator such that the composite material changes colour. When the composite material returns to its initial temperature, the acid solidifies and the composite material returns to its initial colour. According to the invention, the composite material may be colourless at the initial temperature or it may become colourless by heating. It is also possible, in the course of the heating and cooling process, to pass from a transparent composition material to a cloudy or opaque composite material, or vice versa.

According to another embodiment, only one reactant is used, preferably in aqueous solution form. This product may be a UW marker, such as quinine trihydrate to which is added dilute sulphuric acid, an emulsion which is photosensitive in the aqueous phase or a neodymium salt in aqueous solution, which allows a residual magnetism to be given to the composite material and can thus serve to prepare magnetic anti-theft devices used in shops.

The first and second encapsulation products are preferably water-insoluble. They may be different, but are preferably identical: the compatibility with the solvent(s) is easier to determine since the same solvent can then be used in steps a), c) and d) of the process defined above.

The encapsulation products are preferably chosen from:
waxes, which are products or mixtures of products of high molecular weight, that are solid at room temperature. Among the waxes which may be mentioned are animal waxes such as beeswax, lanolin wax, gum lac and Chinese wax; plant waxes such as carnauba wax, candelilla wax, southern-wax-myrtle wax, sugarcane wax; waxes of mineral origin such as ozokerite, ceresin, petroleum waxes and synthetic waxes, such as Carbowaxes, chloronaphthalenes, waxes obtained by Fisher-Tropsch synthesis and silicone waxes;
fatty acid esters such as glyceryl tristearate or glyceryl tripalmitate, and
polyesters, which are of low molecular weight.

Preferably, one (or more) encapsulation product(s) having a very narrow pasty range, on passing from the liquid range to the solid range by varying the temperature, is (are) used.

For step c) of the process according to the invention, the capsules of the second type bearing an electric charge of determined polarity may be selected by placing all of the capsules of the emulsion in contact with a surface bearing an electric charge of determined polarity, to which the capsules of opposite polarity become bound. The bound capsules can then be collected on the said surface, these capsules all having the opposite polarity to that of the said surface.

The solvent(s) used may be any solvent capable of dissolving the first and second encapsulation products and compatible with the matrix and the various reactants, that is to say in particular which is (are) not capable of dissolving the latter. Chlorinated solvents such as trichloroethylene and chloroform are advantageously used. The same solvent is preferably used in steps a), c) and d) of the process.

When the reactant(s) is(are) in solid form, before mixing it (them) with the first encapsulation agent in step a) of the process, the latter is(are) advantageously ground if necessary, for example down to a particle size of less than 1 $\mu$m, preferably of the order of a nanometre. The grinding is advantageously carried out under cold conditions with a disk mill.

In step a) of the process according to the invention, the mixing may be carried out by any conventional means; it advantageously takes place in a machine of blender or kneader type. When there are several reactants, they are introduced successively into the encapsulation product so as to obtain a homogeneous mixture of each of the reactants, the particles of the different reactants being well separated from each other in a continuous phase consisting of the first encapsulation agent. A small amount of solvent is optionally added to adjust the viscosity, so as to obtain a sprayable mixture.

In step b) of the process according to the invention, the mixture is sprayed, in a known manner, using a sprayer in which the mixture is sprayed, for example, using a turbo-mixer or a nozzle, in the upper part of a tower and the droplets of the spray are fractionated, while at the same time removing the solvent, using at least one current of air crossing the descending mobile bed of granules in the direction of the mobile bed and/or in the opposite direction to that of the mobile bed and/or transversely relative to this mobile bed. A simple-action sprayer or a multiple-action sprayer which includes, downstream of the descending mobile bed of granules, at least one area in which the particles are maintained in a fluidized bed using at least one additional stream of gas, may be used, in a known manner. The particles formed have sizes of the order of a $\mu$m.

By this type of spraying, some of the particles obtained are; positively charged and the others are negatively charged; the capsules having an electric charge of determined polarity are selected, for example the negatively charged capsules. With this aim, at least one metal plate which is, for example, negatively charged and on which the positively charged particles become deposited is placed in the sprayer. A sprayer fitted in its upper part with a polarized device intended to remove static electricity in order to avoid any risk of explosion, on which device the capsules of opposite polarity become bound, is advantageously used. Capsules of the first type mainly having an electric charge of polarity identical to that of the, positive or negative, polarized device are thus collected at the sprayer outlet.

When at least two reactants are used, these reactants have been dispersed homogeneously in the first encapsulation product during step a) of the process, such that, statistically, each capsule of the first type contains at least one particle of each of the reactants.

In step c) of the process according to the invention, the capsules of fluid matrix in the second encapsulation product are prepared. In this step, the fluid matrix is mixed with the second encapsulation product, preferably in the presence of a solvent intended to fluidify the second encapsulation product, so as to obtain a homogeneous emulsion. The emulsion obtained, which is electrically neutral overall, contains positively charged droplets and negatively charged droplets; these droplets advantageously have sizes of the order of a µm. Droplets having a determined charge are preferably selected by immersing into the emulsion a negatively or positively charged electrically conductive plate, for example one charged to several kV, on which the droplets become deposited, these droplets all being positively or negatively charged, respectively, and being coated in a certain amount of the second encapsulation product. The plate can then be extracted from the emulsion, electrically disconnected and scraped, so as to obtain capsules of well-determined electric charge which consist of droplets of resin coated with the second encapsulation product.

In step d) of the process according to the invention, the encapsulation product of the capsules of the first type obtained in step b) is preferably softened, using a solvent. The capsules obtained in step b) are preferably treated, since they are generally more resistant. The capsules of the second type obtained in step c) are then added and the mixture is stirred very slowly so as to place the capsules in contact without breaking or crushing them. On account of the fact that the capsules of the first and second types bear opposite charges, couples or pairs of capsules form, one capsule containing reactants which become bound to a capsule containing the matrix and, consequently, homogeneous distribution of the two types of capsules is statistically obtained in the mixture. The mixture is then left to stand in order to demix the encapsulation products. A further amount of solvent may be added so as to demix all of the encapsulation products faster. As the encapsulation products they are disappear, replaced by the fluid matrix, such that a very homogeneous dispersion of the contents of the capsules of the first type remains in the matrix.

In step e), the solvent(s) is(are) removed, generally by distillation under vacuum, and the encapsulation products are removed, generally by filtration, since they form crusts in the absence of solvent. The final product obtained is a composite material consisting of the fluid matrix in which the particles or droplets of reactant(s) are uniformly dispersed: according to the invention, the particles or droplets of dispersed reactant(s) may have sizes of the order of a nanometre.

The subject of the invention is also the composite material which may be obtained by the process defined above, characterized in that it contains a continuous phase consisting of a fluid matrix containing a homogeneous dispersion of at least one reactant which is immiscible with the said matrix. More particualrly, the subject of the invention is the composite material defined above, in which the matrix contains at least one monomer or one polymer of low molecular weight. Even more particularly, the invention relates to a printing ink containing a polymeric continuous phase in which particles of reactant(s) are dispersed homogeneously; such an ink may in particular contain aggregrates of particles of at least two reactants, one of which undergoes a modification under the effect of varying an external parameter, such as the temperature. The invention thus covers a printing ink containing a polymer matrix homogeneously containing aggregates of two reactants, which are solid in the same temperature zone, one of the reactants giving a calorimetric signal when the melting point of the other reactant is reached.

One embodiment of the invention, which will allow it to be better understood, will be given below purely by way of illustration and with no limitation being implied.

In this embodiment, two solid reactants, namely 3-cyclohexylpropionic acid, which has a melting point of 17° C., and the disodium salt of erythrosin, a pH indicator which is orange at pH=3.2 and red at pH=3.6, are dispersed in a polyester matrix of tetrahydrophthalic acid and of propylene glycol. The polyester used is Uradil SZ253 G3Z-50 marketed by the company DSM; this polyester has the appearance of a milky liquid, a viscosity at 23° C. of 9 to 14 dPa·s, a boiling point of 171° C. at 101.3 KPa and a pH of 7.5 to 8.5.

To start with, the 3-cyclohexylpropionic acid is ground at a temperature below 17° C.; at this grinding temperature, the said acid is in the form of crystals of about 1 mm. The grinding is carried out in a disk-mill rotating at a speed of 20,000 rev/min, until particles with a size of the order of a nanometre are obtained. It is not necessary to grind the disodium salt of erythrosin, which may be obtained commercially with a particle size of less than a µm.

To carry out step a) of the process, the ground acid prepared above is first mixed, under cold conditions, with a wax sold under the tradename "Mirror Glaze" by the company "Meginar's" ; this wax contains carnauba wax; a small amount of trichloroethylene is added thereto as solvent. To do this, the wax is mixed in a blender, at slow speed and at room temperature, with increasing amounts of acid until it is saturated with the acid: the amount of acid added is 0.3 g of acid per 1 g of wax. An amount of solvent was added such that the final mixture obtained has a fluidity which allows it to be sprayed subsequently, which corresponds to a viscosity of about 25 dPa·s obtained with 0.6 g of solvent per gram of wax.

When this first mixing is complete, 0.1 g of disodium salt of erythrosin is added and mixing is continued until a mixture which appears homogeneous to the naked eye is obtained.

To carry out step b) of the process, the mixture obtained is introduced, at room temperature, into the tank of a simple-action sprayer of the "MSD" type. The sprayer is fed at an absolute pressure of $10^6$ pascals by a flow rate of the mixture obtained above of 5 kg/h. It consists of a cylindrical tower 12 m in height and 2 m in diameter approximately, which contains in the top part a spray nozzle which generates droplets with an average diameter of about 1 µm. A first flow of air at 10° C. is introduced downwards upstream of the spray nozzle. A second flow of air is introduced transversely by nozzles in the middle zone of the tower, at a temperature below 17° C., with a flow rate of 100 m³/h. A third flow of air at 10° C. is introduced upwards at the bottom of the tower with a flow rate of 100 m³/h. The sprayer is fitted in its upper part with a frustoconical plate of approximately 360 cm², negatively charged to 5 kV and intended to exclude the risk of explosion by electrostatic discharge. 1.1 g of capsules of the first type, 92% of which are negatively charged, are collected at the sprayer outlet. These capsules have a particle size of about 1 μm.

To perform step c), 1 g of the "Uradil" polyester defined above, 2.2 g of the same wax as in step a) and 1.2 g of trichloroethylene are introduced, at a temperature of 15° C., into a mixer rotating at 18,000 rev/min; this mixture is emulsified for 2 to 3 minutes until a composition which appears homogeneous to the eye is obtained. A 120 cm² metal plate negatively charged to 5 kV using a voltage multiplier as described in "Techniques de l'ingénieur" [Engineering Techniques], volume E3 III/chapter E3961-4/paragraph 4.23, is then immersed three times for 5 seconds each into the emulsion obtained. The positively charged droplets are drawn to the plate and become deposited thereon with some of the wax. Capsules of the second type which are all positively charged, formed of wax surrounding droplets of fluid matrix, are obtained by scraping the plate.

In step d), 2 g of capsules of the first type obtained during step b) are introduced into a vessel fitted with a slow (30 rev/min) rotary stirrer and 0.2 g of trichloroethylene is added. After stirring for 2 to 3 minutes, the mixture is left to stand for about 20 minutes, so that the walls of the capsules become softened. 4 g of capsules of the second type obtained in step c) are then added and the mixture is stirred very slowly (30 rev/min) for 2 to 3 minutes, so as to place the two types of capsules in contact without crushing them. The softened capsules containing the reactants and the capsules containing the matrix are electrically drawn to each other and become further bound to each other by means of the fact that the wax in the reactant capsules is softened. The mixture is left to stand for about 3 hours: some of the wax demixes. An additional amount of 1.5 g of trichloroethylene is then added to dissolve the wax and make it demix completely. After 36 hours, the wax phase is completely separated out.

In step e), the solvent is then removed by distillation under vacuum. Wax crusts are formed, which can be removed by screening through screens with a mesh size of 140 to 225 per cm. Since the wax has been replaced by the liquid polymer matrix as it demixes, the composite material obtained consists of a continuous phase formed by the polymer matrix, the said phase containing, in dispersed form, solid particles of 3-cyclohexylpropionic acid and of disodium salt of erythrosin paired in aggregates.

When the composite product is heated to a temperature above 17° C., the 3-cyclohexylpropionic acid melts and, in each aggregate, a droplet of molten product thus formed comes into contact with the solid particle(s) of the disodium salt of erythrosin contained in the same aggregate. The composite then becomes a uniform orange colour. When the temperature is lowered to below 17° C., the 3-cyclohexylpropionic acid resolidifies and the colour disappears.

When it is applied to an object, for example by printing, the composite prepared thus makes it possible to check visually whether this object has a temperature above or below 17° C.

What is claimed is:

1. A composite material comprising at least one reactant homogeneously dispersed in a fluid matrix, obtained by the steps of:
    preparing capsules of a first type containing the reactant (s) with a first encapsulation product;
    preparing capsules of a second type containing the fluid matrix with a second encapsulation product which is compatible with the first, these two types of capsules bearing electric charges of opposite polarity;
    combining the capsules of the two types by electric attraction; and
    removing the first and second encapsulation products without breaking or crushing them so as to obtain said composite material consisting of the fluid matrix containing the reactant(s) in homogeneous dispersion form,
        wherein said composite material includes a continuous phase comprising a fluid matrix comprising a homogeneous dispersion of at least one reactant which is immiscible with said matrix.

2. The composite material of claim 1, wherein said matrix contains at least one of a monomer and a polymer of low molecular weight.

3. A composite material comprising at least one reactant homogeneously dispersed in a fluid matrix, obtained by the steps of:
    preparing capsules of a first type containing the reactant (s) with a first encapsulation product;
    preparing capsules of a second type containing the fluid matrix with a second encapsulation product which is compatible with the first, these two types of capsules bearing electric charges of opposite polarity;
    combining the capsules of the two types by electric attraction; and
    removing the first and second encapsulation products so as to obtain said composite material consisting of the fluid matrix containing the reactant(s) in homogeneous dispersion form,
        wherein said composite material includes a continuous phase comprising a fluid matrix comprising a homogeneous dispersion of at least one reactant which is immiscible with said matrix,
        wherein said matrix contains at least one of a monomer and a Polymer of low molecular weight, and
        further comprising a polymer matrix homogeneously comprising aggregates of at least two reactants, which reactants are solid in the same temperature zone, one of said reactants giving a calorimetric signal when the melting point of another of said reactants is reached.

4. A composite material comprising at least one reactant homogeneously dispersed in a fluid matrix, obtained by the steps of:
    a) preparing a first type of capsules containing a reactant in a first encapsulation product bearing a given electric charge;
    b) preparing a second type of capsules containing the fluid matrix in a second encapsulation product bearing an electric charge opposite to the given electric charge of the first type of capsules, the second encapsulation product being compatible with the first encapsulation product;
    c) associating the two types of capsules by electric attraction;

d) removing the first and second encapsulation products without breaking or crushing them; and e) recovering a composite material consisting of the fluid matrix containing the reactant in an homogeneous dispersion, wherein said composite material includes a continuous phase comprising a fluid matrix comprising a homogeneous dispersion of at least one reactant which is immiscible with said matrix.

5. The composite material of claim 4, wherein said matrix contains at least one of a monomer and a polymer of low molecular weight.

6. A composite material comprising at least one reactant homogeneously dispersed in a fluid matrix, obtained by the steps of:

a) preparing a first type of capsules containing a reactant in a first encapsulation product bearing a given electric charge;

b) preparing a second type of capsules containing the fluid matrix in a second encapsulation product bearing an electric charge opposite to the given electric charge of the first type of capsules, the second encapsulation product being compatible with the first encapsulation product;

c) associating the two types of capsules by electric attraction;

d) removing the first and second encapsulation products; and e) recovering a composite material consisting of the fluid matrix containing the reactant in an homogeneous dispersion, wherein said composite material includes a continuous phase comprising a fluid matrix comprising a homogeneous dispersion of at least one reactant which is immiscible with said matrix, wherein said matrix contains at least one of a monomer and a polymer of low molecular weight, and further comprising a polymer matrix homogeneously comprising aggregates of at least two reactants, which reactants are solid in the same temperature zone, one of said reactants giving a calorimetric signal when the melting point of another of said reactants is reached.

* * * * *